United States Patent
Kihara et al.

(10) Patent No.: US 8,535,472 B2
(45) Date of Patent: Sep. 17, 2013

(54) LASER-WELDED ARTICLE

(75) Inventors: Tetsuji Kihara, Neyagawa (JP); Satoshi Yamamoto, Neyagawa (JP)

(73) Assignee: Orient Chemical Industries, Ltd., Osaka (JP)

( * ) Notice: Subject to any disclaimer, the term of this patent is extended or adjusted under 35 U.S.C. 154(b) by 271 days.

(21) Appl. No.: 12/659,928

(22) Filed: Mar. 25, 2010

(65) Prior Publication Data

US 2010/0186886 A1 Jul. 29, 2010

Related U.S. Application Data

(63) Continuation of application No. 11/522,321, filed on Sep. 18, 2006, now abandoned.

(30) Foreign Application Priority Data

Sep. 21, 2005 (JP) .................................. 2005-274000

(51) Int. Cl.
*B29C 65/16* (2006.01)

(52) U.S. Cl.
USPC ...................... 156/272.8; 264/239; 264/297.1

(58) Field of Classification Search
USPC ................. 156/272.8, 272.2; 264/239, 279.1
See application file for complete search history.

(56) References Cited

U.S. PATENT DOCUMENTS

| 6,265,081 | B1 | 7/2001 | Urabe et al. | |
| 7,744,804 | B2 * | 6/2010 | Nakagawa et al. | 264/482 |
| 2003/0039837 | A1 | 2/2003 | Koshida et al. | |
| 2003/0125429 | A1 | 7/2003 | Joachimi et al. | |
| 2004/0102559 | A1 | 5/2004 | Oyamada et al. | |
| 2004/0242757 | A1 * | 12/2004 | Ulrich et al. | 524/514 |

FOREIGN PATENT DOCUMENTS

| JP | A-2004-148800 | 5/2004 |
| WO | WO 02/057353 A2 | 7/2002 |
| WO | WO 2005021657 A1 * | 3/2005 |

OTHER PUBLICATIONS

English machine translation of WO 2005/021657 A1.*

* cited by examiner

*Primary Examiner* — Richard Crispino
*Assistant Examiner* — Elizabeth Royston
(74) *Attorney, Agent, or Firm* — Oliff & Berridge, PLC

(57) ABSTRACT

A method of manufacturing laser-welded article having an integral construction of piled workpieces, that are welded by heat generated from irradiation with laser and include thermoplastic resin, a laser-transmissible-absorptive molded workpiece including a thermoplastic resin and 0.001 to 0.3 weight % of colorant consisting of nigrosine which has an absorption coefficient: $\epsilon$ for a ray of 940 nm ranging form 4000 to 7000, that transmits laser partially and absorbs laser partially, and a laser-absorptive molded workpiece including a thermoplastic resin and 0.1 to 5 weight % of diverse colorant comprising nigrosine and/or carbon black, that absorbs the laser.

9 Claims, 1 Drawing Sheet

LASER-WELDED ARTICLE

This is a Continuation of application Ser. No. 11/522,321 filed Sep. 18, 2006, which claims priority to Japanese Patent Application No. 2005-274000 filed Sep. 21, 2005. The disclosure of the prior applications is hereby incorporated by reference herein in their entirety.

BACKGROUND OF THE INVENTION

This invention relates to a laser-welded article that a laser-transmissible-absorptive molded workpiece including nigrosine alone as colorant and a laser-absorptive molded workpiece are welded by laser at a time and unified.

For mutually joining workpieces made from a synthetic thermoplastic resin material, a method for laser welding is known.

Such laser welding is executed for example as follows. As shown in FIG. 2, a laser-transmissible workpiece 11 is used for one workpiece and for the other workpiece, a laser-absorptive workpiece 12 is used. These workpieces are then put together. A laser 13 is irradiated from a side of the laser-transmissible workpiece 11 towards the laser-absorptive workpiece 12. And the laser 13 transmitted through the laser-transmissible workpiece 11 is absorbed into the laser-absorptive workpiece 12, and then heat is caused thereat. The heat melts the laser-absorptive workpiece 12 mainly at a laser-absorbing part, and then it melts the laser-transmissible workpiece 11 to weld both workpieces. After cooling, the laser-transmissible workpiece 11 and the laser-absorptive workpiece 12 are firmly joined at a welding position 14.

Merits of the laser welding are feasibility of welding workpieces without any contacts of a laser beam source to workpieces being due to weld; little thermal influence on laser-absorbing neighborhood by local heat; no threat of mechanical vibration; feasibility of mutually welding fine parts or workpieces having three-dimensionally complicated structures; excellent reproducibility; feasibility of maintaining sufficient airtightness; excellent welding strength; difficulty of recognizing a boundary line of a welding position by visual observation; no generation of dust and so on.

According to the laser welding, it is not only capable of welding certainly by simple operation but also achieving equal or more welding strength, as compared with prior methods for joining resin parts. Examples of the prior methods for joining resin parts are clamping by a clamp such as a bolt, a screw, a clip and so on, adhering by an adhesive material, vibration welding, ultrasonic welding and so on. The laser welding also achieves labor saving, improvement of productivity, lowering of production costs and so on because of its little vibratory or thermal influence on the laser-welded article. Accordingly, under an automobile industry, electric industry or electronic industry for example, the laser welding is practical for joining functional parts or electronic parts that are due to avoid the vibratory or thermal influence thereon. Also the laser welding can be adapted for joining resin parts having a complicated shape.

In Japanese Patent Provisional Publication No. 2004-148800, a method for the laser welding is mentioned. In the method, a first resin workpiece that has weak absorptiveness to a laser and a second resin workpiece that is absorptive to a laser are put together, and then a laser is irradiated from a side of the first resin workpiece to weld both workpieces. In this case, however, the first resin workpiece is prepared by knead ing a resin and an additive such as a copolymer of ethylene and/or propylene and another olefin or vinyl compound. And the first resin workpiece includes relatively much additive. Therefore, there is a problem that the resin property of the first resin workpiece is easily influenced by the additive. Also, there are some other problems.

Depending on a sort of the resin and the additive, a separation of layers in the kneading procedure, a deterioration of strength of the welded article, and a restriction of using any resin are caused.

SUMMARY OF THE INVENTION

The present invention has been developed to solve the foregoing problems. It is an object of the present invention to provide a laser-welded article that workpieces prepared simply can be easily unified by laser in one laser welding process without using complicated processes. Moreover, the laser-welded article has sufficient welding strength and excellent appearance, and does not damage the resin property.

A laser-welded article of the present invention developed for accomplishing the foregoing objects comprises:

an integral construction of piled workpieces, that are welded by heat caused by irradiation with laser, which comprises;

a laser-transmissible-absorptive molded workpiece including a thermoplastic resin and 0.001 to 0.3 weight % of colorant consisting of nigrosine which has an absorption coefficient: $\epsilon$ for a ray of 940 nm ranging form 4000 to 7000 (ml/g·cm), that transmits laser partially and absorbs laser partially, and a laser-absorptive molded workpiece including a thermoplastic resin and 0.1 to 5 weight % of diverse colorant comprising nigrosine and/or carbon black, that absorbs the laser.

That is to say, the laser-transmissible-absorptive molded workpiece is a molded workpiece that has a property of laser-transmissivity and also a property of weak laser-absorbancy.

The diverse colorant may include carbon black.

The diverse colorant may include furthermore nigrosine.

In the laser-welded article, the laser-transmissible-absorptive molded workpiece satisfies the following numerical expression (I)

$$0.07 \leq a_1 = \epsilon_1 C_1 L_1 \leq 0.8 \quad (I)$$

In the numerical expression (I), $a_1$ is absorbance thereof, $\epsilon_1$ (1/cm) is an absorption coefficient thereof, $C_1$ (weight %) is concentration of the colorant therein, $L_1$ (cm) is thickness thereof.

In the laser-welded article, the laser-absorptive molded workpiece satisfies the following numerical expression (II)

$$1 \leq a_2 = \epsilon_2 C_2 L_2 \leq 50 \quad (II)$$

In the numerical expression (II), $a_2$ is absorbance thereof, $\epsilon_2$ (1/cm) is an absorption coefficient thereof, $C_2$ (weight %) is concentration of the diverse colorant therein, $L_2$ (cm) is thickness thereof.

In the laser-welded article, nigrosine includes at least one selected from the group consisting of compounds represented by the following chemical formulas (1) to (4).

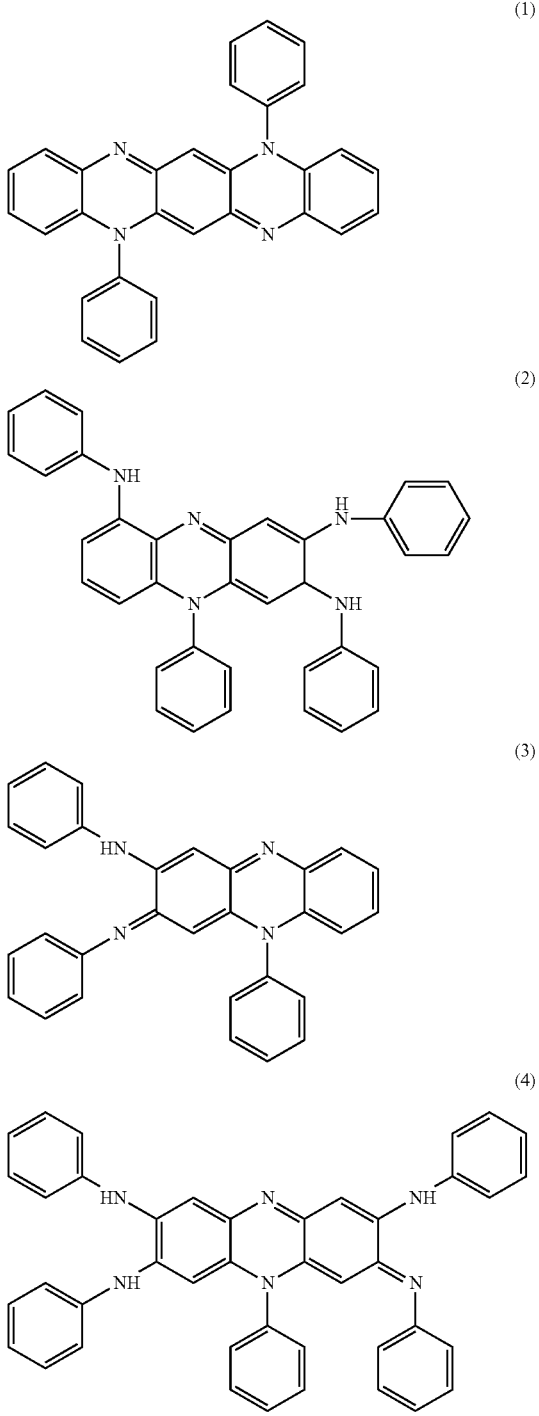

The laser-transmissible-absorptive molded workpiece includes at least one thermoplastic resin selected from the group consisting of polyamide resin, polycarbonate resin, polyphenylene sulfide resin, polyester resin, and polyolefin resin.

The laser-transmissible-absorptive molded workpiece includes the resin of polyamide resin and 0.01 to 0.2 weight % of the colorant consisting of nigrosine.

The laser-transmissible-absorptive molded workpiece includes the resin of polycarbonate resin and 0.01 to 0.2 weight % of the colorant consisting of nigrosine.

Concentration of iron in nigrosine is 1 weight % at maximum.

Concentration of aniline in nigrosine is 1 weight % at maximum.

The laser-transmissible-absorptive molded workpiece and the laser-absorptive molded workpiece have thicknesses ranging from 200 to 5000 microns.

The laser-transmissible-absorptive molded workpiece and the laser-absorptive molded workpiece are films having thicknesses ranging from 200 to 1000 microns.

The laser-welded article of the present invention keeps the best of intrinsic properties of the resin used for the molded workpiece because a trace of nigrosine in the laser-transmissible-absorptive molded workpiece of the laser-welded article has sufficient solubility into oil, compatibility for the resin, solubility for the resin and a retardation effect.

Especially the laser-welded article using the laser-transmissible-absorptive molded workpiece is firmly welded because the laser properly causes the heat for melting widely to weld. Therefore, the laser-welded article having sufficient tensile stress strength and welding strength is obtained.

The laser-welded article is simply manufactured without requiring any inconvenient pretreatments for adhering workpieces made from resin or complicated processes such as alloying. This laser-welded article is welded by laser in one laser welding process and therefore has high productive efficiency.

And adhesive materials or clamps for joining are not used for the laser-welded article. Therefore, the laser-welded article has excellent recycling property.

DETAILED EXPLANATION OF THE INVENTION

Figure 1:
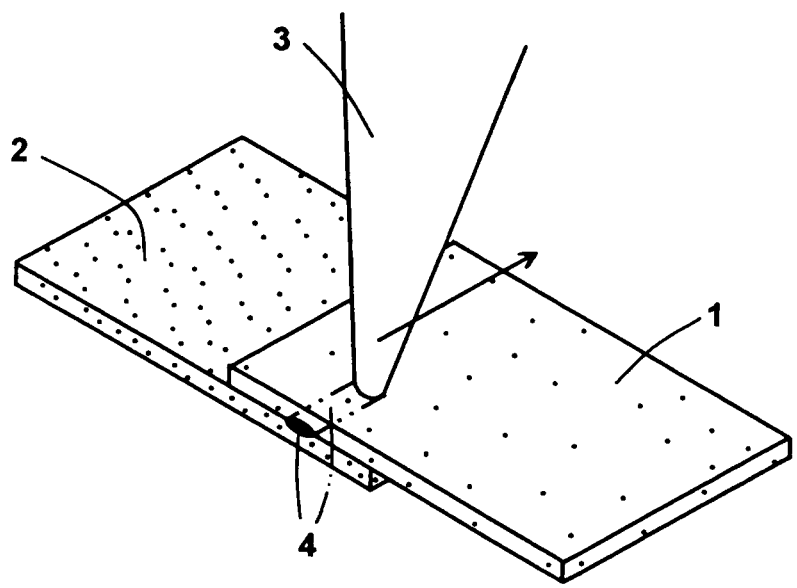
FIG. 1 shows one embodiment of a laser-welded article to which the present invention is applied.

Hereunder one embodiment of the laser-welded article of the present invention is explained in detail as referring to FIG. 1 that corresponds to Examples.

A laser-transmissible-absorptive molded plate workpiece 1 that includes colorant consisting of nigrosine, and a laser-absorptive molded workpiece 2 that includes diverse colorant consisting of nigrosine and/or carbon black are employed for a laser-welded article. The workpieces are put together to pile at an end part thereof and are firmly welded and unified to prepare a laser-welded article that is an integral construction of the workpieces.

Figure 2:
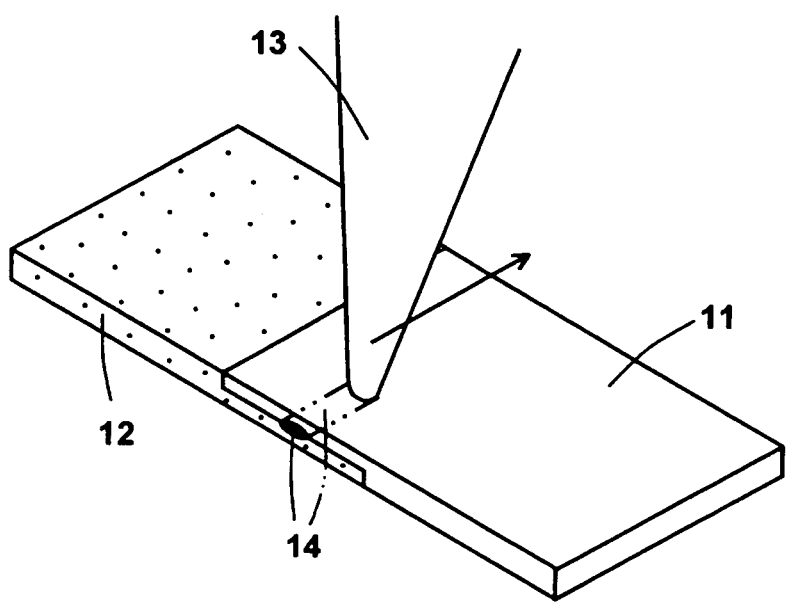
FIG. 2 shows one embodiment of a laser-welded article to which the present invention is not applied.

Incidentally the laser-transmissible-absorptive molded workpiece 1 and the laser-absorptive molded workpiece 2 are allowed to take an optional shape. The workpieces may be respectively plural components of flat films or plates having even thicknesses, as mentioned above. The workpieces may be respectively plural components of curved or bended plates or boxes. And as shown in FIG. 2, the workpieces may respectively have a stair of a joint flap at the put position.

One embodiment of the manufacturing process for the laser-welded article is explained in detail. The manufacturing process thereof consists of the following procedures (A) to (F), for example.

(A) A resin and 0.001 to 0.3 weight % of colorant consisting of nigrosine which has an absorption coefficient: $\epsilon$ for a ray of 940 nm ranging from 4000 to 7000 (ml/g·cm) are kneaded and molded to prepare a laser-transmissible-absorptive molded workpiece 1. In order to transmit suitable quantity of partial laser for laser welding and to absorb suitable quantity of residual laser, the workpiece 1 is controlled by increasing or decreasing the amount of colorant.

(B) A resin and 0.1 to 5 weight % of the diverse colorant consisting of carbon black and/or nigrosine that is much than the same or different nigrosine in the laser-transmissible-absorptive molded workpiece 1, are kneaded and molded to prepare a laser-absorptive molded workpiece 2. In order to absorb the laser for laser welding, the laser-absorptive molded workpiece 2 is controlled by increasing or decreasing the amount or composition of diverse colorant.

(C) The laser-transmissible-absorptive molded workpiece 1 and the laser-absorptive molded workpiece 2 are put together. If necessary on the occasion of putting the molded workpieces 1 and 2 for fixing, they may be put together by pressing with a holding tool. And a material having antireflection property such as an antireflection film, another material having cooling effect, or a gas treatment equipment may be placed at a side of the laser-transmissible-absorptive molded workpiece.

(D) Output power of a laser 3 is regulated properly in order that a suitable quantity of the laser 3 transmits through the laser-transmissible-absorptive molded workpiece 1 and also that a suitable quantity of the residual laser is absorbed into the laser-absorptive molded workpiece 2. The regulated laser 3 having proper output power is irradiated from a side of the laser-transmissible-absorptive molded workpiece 1.

(E) The partial laser 3 transmits through the laser-transmissible-absorptive molded workpiece 1, and the other partial laser 3 is absorbed into the molded workpiece 1 and then causes heat. The laser 3 transmitted through the laser-transmissible-absorptive molded workpiece 1 reaches and is absorbed into the laser-absorptive molded workpiece 2 and then causes heat. Mainly at these heated parts, the laser-transmissible-absorptive molded workpiece 1 and the laser-absorptive molded workpiece 2 melt.

(F) When the melting position thereof is cooled down and then hardens, the laser-transmissible-absorptive molded workpiece 1 and the laser-absorptive molded workpiece 2 are welded. Consequently, the workpieces 1 and 2 are firmly joined at a welding position 4 and are unified to become a laser-welded article of an integral construction.

According to a prior method for a laser welding to prepare a laser-welded article made of the laser-transmissible molded workpiece and the laser-absorptive molded workpiece, heat generated from irradiation with radiation to the laser-absorptive workpiece entirely melts the laser-absorptive molded workpiece. The heat then melts the laser-transmissible molded workpiece. Therefore, thermal efficiency thereof is not so superior. The resin of the laser-absorptive molded workpiece melts largely, but the resin of the laser-transmissible molded workpiece melts slightly. Therefore, the welding strength thereof is insufficient.

On the other hand, the laser-welded article of the present invention is made of the laser-transmissible-absorptive molded workpiece 1 including colorant consisting of nigrosine and the laser-absorptive molded workpiece 2, and both workpieces 1 and 2 cause heat. Therefore, temperature gradient between both workpiece 1 and 2 is negligible. And, the laser welding is efficiently performed using lower output power. Furthermore, melted resin positions of both workpieces 1 and 2 are larger. Consequently, the welding strength thereof is extremely sufficient.

Examples of laser used for the laser welding are solid laser such as Nd:yttrium aluminum garnet (YAG) excitation and semiconductor laser excitation, semiconductor laser, tunable diode laser, titanium-sapphire laser (Nd:YAG excitation) and so on. Other examples are a halogen lamp and a xenon lamp that generates infrared rays having wavelength of 700 nm or more. Among these lasers, the irradiated laser ranging from 800 nm to 1600 nm that is a longer wavelength compared with visible radiation is usually used for the laser welding. The irradiated laser is preferably ranging from 800 nm to 1100 nm.

The infrared rays or the laser is allowed to be irradiated vertically or slantingly towards a surface of the laser-transmissible-absorptive molded workpiece. The laser is allowed to be irradiated from sole or plural direction.

The output power of the laser is regulated properly according to scanning speed and laser-absorptivity of the laser-transmissible-absorptive molded workpiece and laser-absorptive molded workpiece. If the output power is too insufficient, the resins of the workpieces are hard to melt at put surfaces thereof mutually. If the output power is excess, the resins of the workpieces vaporize or deteriorate, and the welding strength thereof is insufficient. For adapting the irradiation conditions, width or time of irradiating the infrared rays or the laser is regulated properly.

The laser-welded article unified by these procedures develops the practically sufficient welding strength at the welding positions. Also when the laser-welded article is welded under proper conditions, the tensile stress strength thereof in accordance with Japanese Industrial Standard K-7113-1995 is 300N or more.

When the laser-welded article is used for a medical tube of infusion of instillation, for a spout pouch of fluid diet or beverage composition and so on, it must be safely used without leaking. For that purpose, it is preferable that the laser-welded article has the thickness of 200 to 5000 microns of the laser-transmissible-absorptive molded workpiece. If the thickness of the laser-transmissible-absorptive molded workpiece is less than 200 microns, it is difficult to control the laser energy. Therefore, the melting by the heat in the laser welding process is insufficient or excess. As a result, the laser-welded article is broken by overheating or cannot achieve sufficient welding strength. On the other hand, if the thickness of the laser-transmissible-absorptive molded workpiece is more than 5000 microns, the transmissivity for the laser decreases. As a result, the laser-welded article cannot achieve sufficient welding strength.

Especially it is preferable that the laser-transmissible-absorptive molded workpiece is composed of films having the thickness of 200 to 1000 microns.

The laser-transmissible-absorptive molded workpiece is explained concretely.

A mixture of nigrosine and a resin such as a laser-transmissible resin is molded to prepare the laser-transmissible-absorptive molded workpiece. The laser-transmissible-absorptive molded workpiece has properties of transmitting quantity of partial laser and absorbing quantity of residual laser. The properties are proceeded from a little amount of the colorant consisting of nigrosine in the molded workpiece. The colorant absorbs the quantity of partial laser with resonance towards wavelength of the laser and transmits the quantity of residual laser.

Examples of the laser-transmissible resin are a resin having laser-transmissible property used as a dispersant for the pigment, and known resin used as carrier resin of masterbatch or colored pellets. Concrete typical examples of the resin are thermoplastic resins such as polyphenylene sulfide resin; polyamide resin (PA); polyethylene resin; polypropylene resin; polystyrene resin; polymethylpentene resin; methacrylate resin; acrylpolyamide resin; ethylenevinylalcohol (EVOH) resin; polycarbonate resin (PC); polyester resin illustrated with polyethylene terephthalate (PET), polybutylene terephthalate (PBT) and so on; polyacetal resin; polyvinyl chloride resin; polyvinylidene chloride resin; polyphenylene oxide resin; polyarylate resin; polyallylsulfone resin; fluorine-contained resin; liquid crystal polymer and so on.

Further, the thermoplastic resin is allowed to be a copolymer resin made from two or more monomers and so on that construct the above-mentioned thermoplastic resins. Concrete examples of the copolymer resin are acrylonitrile-styrene copolymer resin (AS), acrylonitrile-butadiene-styrene copolymer resin (ABS), acrylonitrile-ethylene propylene diene monomer-styrene copolymer resin (AES), polyamide-polybutylene terephthalate copolymer resin (PA-PBT), polyethylene terephthalate-polybutylene terephthalate copolymer resin (PET-PBT), polycarbonate-polybutylene terephthalate copolymer resin (PC-PBT), polycarbonate-polyamide copolymer resin (PC-PA) and so on. And other concrete examples of the resin are a thermoplastic elastomer such as polystyrene thermoplastic elastomer, polyolefin thermoplastic elastomer, polyurethane thermoplastic elastomer, and polyester thermoplastic elastomer; synthetic wax or natural wax that contains the above-mentioned resins as the main component. Incidentally, molecular weight of the thermoplastic resins is not intended to be limited. Also, the thermoplastic resins may be used solely or plurally.

It is preferable that the thermoplastic resin is polyamide resin (Nylon that is a registered trademark), polycarbonate resin, polyphenylene sulfide resin (PPS), polyester resin of which PET and PBT belong to the category, and polyolefin resin of which polypropylene (PP) and polyethylene (PE) belong to the category.

It is further preferable that the thermoplastic resin is polyamide resin, polycarbonate resin or polyolefin resin, taking transmittance into consideration. It is furthermore preferable that the thermoplastic resin is the polyamide resin (Nylon).

Examples of the polyamide resin (Nylon) are nylon 6, nylon 66, nylon 46, nylon 11, nylon 12, nylon 69, nylon 610, nylon 612, nylon 96, non-crystal nylon, nylon having high melting point, nylon RIM, nylon MIX6 and so on; copolymer of two or more kinds thereof such as nylon 6/66 copolymer, nylon 6/66/610 copolymer, nylon 6/66/11/12 copolymer, crystal nylon/non-crystal nylon copolymer and so on. The polyamide resin may be mixed polymer of polyamide resin and another synthetic resin. Examples of the mixed polymer are polyamide/polyester mixed polymer, polyamide/polyphenyleneoxide mixed polymer, polyamide/polycarbonate mixed polymer, polyamide/polyolefin mixed polymer, polyamide/styrene/acrylonitrile mixed polymer, polyamide/polyacrylate mixed polymer, polyamide/silicone mixed polymer and so on. These polyamide resins may be used solely or plurally.

Polycarbonate is a thermoplastic resin having bindings of carbonic ester in principle chain thereof. Polycarbonate has a mechanical property for strength, heat resistance, cold resistance, electrical property, transparency and so on and is a typical engineering plastic. Polycarbonate that is industrially manufactured at present is aromatic polycarbonate made from bisphenol A. Examples of method for manufacturing thereof are a method using phosgene and a method by ester interchange. The molecule thereof has a liner chemical structure that many carbonic ester groups having aromatic hydrocarbon group are bound. The chemical structure has bulky benzene rings and flexible carbonic ester groups in the principle chain. The bulky benzene rings accomplish high temperature for thermal deforming and excellent physical or mechanical properties. The flexible carbonic ester groups contribute to moldability and flexibility, however easily cause hydrolysis.

The colorant included in a laser-transmissible-absorptive molded workpiece consists of nigrosine that has an absorption coefficient (i.e. absorbancy index): $\epsilon$ for a ray of 940 nm ranging form 4000 to 7000 (ml/g·cm). If the absorption coefficient: $\epsilon$ thereof exceeds 7000, transmittance of the irradiated laser is so low that the welding strength of the laser-welded article is insufficient. If the absorption coefficient: $\epsilon$ thereof is less than 4000, the heat is so little that the welding strength of the laser-welded article is insufficient.

A method for determining the absorption coefficient (i.e. absorbancy index): $\epsilon$ is as follows. 0.05 g of laser-transmissible absorbent are exactly weighed and dissolved in solvent for example N,N-dimethylformamide (DMF) by using 50 ml of a volumetric flask. Then 1 ml thereof is diluted by DMF to prepare a measuring sample. Foremost an absorbance to rays of 940 nm is determined by using a spectrophotometer UV1600PC, which is available from Shimadzu Corporation. Then an absorption coefficient (i.e. absorbancy index): $\epsilon$ (ml/g·cm) is calculated using the absorbance.

Examples of nigrosine are a black azine condensed mixture such as C. I. SOLVENT BLACK 5 and C. I. SOLVENT BLACK 7 described on COLOR INDEX. It is preferably C. I. SOLVENT BLACK 7. The nigrosines are synthesized by reaction of oxidation and dehydrating condensation of aniline, aniline hydrochloride and nitrobenzene at 160° C. to 180° C. as reaction temperature under the existence of iron chloride. NUBIAN BLACK series as the nigrosine is commercially available from Orient Chemical Industries, Ltd., An average particle size of nigrosine as color is preferably ranging from 5 to 20 microns, and it is furthermore preferably ranging from 5 to 15 microns. When the above nigrosine as color is used, a welding procedure is easily performed and the even laser-welded article is prepared.

Concentration of iron in nigrosine is for example less than 1 weight %, preferably less than 0.5 weight %, furthermore preferably less than 0.4 weight %. This improves dispersibility or compatibility of nigrosine as color for the resin and therefore the quality laser-welded article made from the resin is prepared. Content of iron in nigrosine is determined by atomic absorption spectrometry. An example of a decreasing treatment for iron is a following procedure. Aniline or aniline hydrochloride with nitrobenzene under presence of ferric chloride is condensed to prepare nigrosine condensation product. Sodium hydroxide is added to the condensation product to treat into base for nigrosine. Ferric hydroxide is obtained as iron component. Obtained ferric hydroxide is removed by a centrifugal separator such as screw-decanter-type, sharpless-type and so on. After drying, iron content in nigrosine is decreased and adapted.

Concentration of aniline in nigrosine is for example less than 1 weight %, preferably less than 0.5 weight %, furthermore preferably 0.4 weight %. Examples of a decreasing treatment for aniline are following procedures.

(i) A procedure comprises of adding solvent having a boiling point ranging from 100 to 230° C., and then heating and reducing pressure to remove aniline or nitrobenzene with the solvent. (Incidentally, examples of the solvent are xylene, toluene, ethylbenzene, mesitylene, decahydronaphthalene, dibutyl ether, ethylene glycol and so on.)

(ii) A procedure comprises of removing nigrosine by washing with solution that has capacity for dissolving aniline. (Incidentally, examples of the solution are organic solvent such as alcohol, aqueous solution, mixed solution of organic solvent and water, or acidic solution thereof.)

(iii) A procedure comprises a removing procedure by heating and reducing pressure merely.
(iv) A procedure comprises a heating and evaporating procedure.
(v) A procedure comprises a distilling procedure such as steam distillation and so on.
(vi) A procedure comprises oxidation procedure using oxygen, ozone or various oxidant.

When nigrosine includes at least one selected from a group consisting of compounds represented by the before-mentioned chemical formulas (1) to (4), the laser-welded article having pretty appearance and sufficient welding strength is obtained advantageously.

And Content of nigrosine to the laser-transmissible resin is preferably 0.001 to 0.3 weight %. If the content is less than 0.001 weight %, the heat through absorption of energy of the laser is so insufficient that the heat fails to raise the temperature and the welding strength at the welded position of the laser-transmissible-absorptive molded workpiece and the laser-absorptive molded workpiece is insufficient. If the content excesses 0.3 weight %, the laser-transmittance is easy to decrease and the welding strength between the mutual workpieces is insufficient.

When the laser-transmissible resin is polyamide resin, the content of nigrosine is preferably ranging from 0.01 to 0.2 weight %. When the laser-transmissible resin is polycarbonate resin, the content of nigrosine is preferably ranging from 0.01 to 0.2 weight %. It is because the heat is properly generated and the sufficient welding strength between the mutual workpieces is accomplished.

The absorbance $a_1$ of the laser-transmissible-absorptive molded workpiece is adjusted to satisfy the following numerical expression (1).

$$0.07 \leq a_1 = \epsilon_1 C_1 L_1 \leq 0.8 \qquad (I)$$

In the numerical expression (I), $a_1$ is absorbance thereof, $\epsilon_1$ (1/cm) is absorption coefficient thereof, $C_1$ (weight %) is concentration of the colorant therein, $L_1$ (cm) is thickness thereof.

In this occasion, If the absorbance: $a_1$ is less than 0.07, the heat through absorption of energy of the laser into the laser-transmissible-absorptive molded workpiece is so insufficient that the heat fails to raise the temperature and the welding strength at the welded position of the laser-transmissible-absorptive molded workpiece and the laser-absorptive molded workpiece is insufficient. If the absorbance: $a_1$ excesses 0.8, the laser-transmittance of the laser-transmissible-absorptive molded workpiece decreases, and the welding strength between the laser-transmissible-absorptive molded workpiece and the laser-absorptive molded workpiece is insufficient.

It is preferable that the laser-transmissivity $T_1$ (%) of the laser-transmissible-absorptive molded workpiece to the laser of 940 nm is ranging from 14% to 80%. This laser-transmissivity $T_1$ to the laser is a value measured from a molded plate of 1 mm thickness of the laser-transmissible-absorptive molded workpiece.

For preparing the laser-transmissible-absorptive molded workpiece, the laser-transmissible resin may include various additives if necessary. Examples of the additive are an auxiliary coloring agent, a dispersant, a reinforcer (or a filler), a stabilizer, a plasticizer, a reforming agent, an ultraviolet-absorptive agent (or a light-stabilizer), an antioxidant, an antistatic agent, a lubricant, a mold releasing agent, a crystallization accelerator, a crystalline germ agent, a flame retarder and so on.

The reinforcer, which is used for general reinforcement of a synthetic resin, is not intended to be limited. Examples of the reinforcer are a glass fiber, a carbon fiber, other inorganic fibers, and other organic fibers made from aramid, polyphenylene sulfide resin (PPS), nylon, polyester, liquid crystal polymer and so on. The glass fiber is preferable for the reinforcement of the resin, which is required a transparent. In order to practically use the glass fiber, it is preferable that the length of the glass fiber is ranging from 2 to 15 mm and the diameter thereof is ranging from 1 to 20 microns. A shape of the glass fiber is not intended to be limited. Examples of the shape thereof are a roving, a milled fiber and so on. The glass fiber can be used solely or plurally.

Examples of the filler are a plate-shaped filler such as mica, sericite and glass flakes; silicate such as talc, kaolin, clay, wollastonite, bentonite, asbestos and alumina silicate; metal oxide such as alumina, silicon oxide, magnesium oxide, zirconium oxide and titanium oxide; carbonate such as calcium carbonate, magnesium carbonate and dolomite; sulfate such as calcium sulfate and barium sulfate; granular filler such as glass beads, ceramic beads, boron nitride and silicon carbide.

The laser-transmissible-absorptive molded workpiece may be prepared by using a masterbatch of the laser-transmissible-absorptive colored thermoplastic resin composition. The masterbatch may be prepared by an arbitrary method. For example, the masterbatch may be prepared by mixing a resin powder or pellets as the base of the masterbatch and the colorant with a mixer such as a tumbler, a supermixer and so on, heating and melting the mixture with a extruder, a batch-type kneader or a roll-type kneader and so on, and then forming pellets or grain.

Molding process of the laser-transmissible-absorptive molded workpiece may be executed by general various procedures. For example, the molding process may be executed by using the colored pellets with a processing machine such as an extruder, an injection molding machine, a roll mill and so on. Another molding process may be executed with the proper mixer by mixing the pellets or the grain made from a transparent resin, a granulated colorant, and if necessary, various additives, and then the mixture is molded with a processing machine. Another molding process may be executed by adding the colorant to a monomer including a proper polymerization catalyst, polymerizing the mixture to obtain the desired resin, and then molding the obtained resin by a proper procedure. Examples of the molding procedure may be general molding procedures such as injection molding, extrusion molding, compression molding, foaming molding, blow molding, vacuum molding, injection blow molding, rotational molding, calendaring molding, solution casting and so on. The laser-transmissible-absorptive molded workpieces having various shapes are obtained by these molding procedures.

The laser-absorptive molded workpiece is explained concretely.

The mixture of a laser-transmissible resin, which is the same as the resin of the before-mentioned laser-transmissible-absorptive molded workpiece, and a colorant that is dispersed in the resin and absorbs the laser are molded to prepare the laser-absorptive molded workpiece. When the laser is irradiated thereto, the laser is absorbed and the laser-absorptive molded workpiece melts.

According to uses or purposes, the laser-transmissible resin may properly include various additives such as the same type of additives as mentioned before. Examples of the additives are an auxiliary coloring agent, a dispersant, a reinforcer (or a filler), a stabilizer, a plasticizer, a reforming agent, an ultraviolet-absorptive agent (or a light-stabilizer), an antioxidant, an antistatic agent, a lubricant, a mold releasing agent, a crystallization accelerator, a crystalline germ agent, a flame retarder and so on.

Examples of the colorant in the laser-absorptive molded workpiece that absorbs the laser are carbon black and/or nigrosine. The colorant means nigrosine, carbon black, or mixture of nigrosine and carbon black. And hereunder it is often expressed with the colorant that absorbs the laser. The colorant that causes the heat by absorption of the laser much to energy density is carbon black, or combination of carbon black and nigrosine. An amount of nigrosine is regulate as to an amount of carbon black according to the condition of the laser welding, and the heat quantity of the laser-absorptive molded workpiece is controlled properly.

The laser-absorptive molded workpiece includes 0.1 to 5 weight %, preferably 0.1 to 2 weight %, of the diverse colorant comprising nigrosine and/or carbon black.

The proper amount of the diverse colorant is mentioned according to kinds thereof.

When the colorant in the thermoplastic resin that absorbs the laser consists of carbon black, the amount of the colorant is 0.1 to 0.3 weight %. When the colorant in the thermoplastic resin that absorbs the laser consists of nigrosine, the amount thereof is 0.1 to 0.7 weight %. When the colorant consists of combination of carbon black and nigrosine, the amount thereof is 0.1 to 0.6 weight %. A rate of the combination of carbon black and nigrosine is preferably 1:2 to 2:1.

The transmissivity of the laser-absorptive molded workpiece to the irradiated laser is preferably 5 weight % or less. If the transmissivity excesses 5%, the energy of laser that transmits the laser-transmissible-absorptive molded workpiece and then is absorbed into the laser-absorptive molded workpiece is insufficient or is lost.

The absorbance $a_2$ of the laser-absorptive molded workpiece is adjusted to satisfy the condition of the following numerical expression (II).

$$1 \leq a_2 = \epsilon_2 C_2 L_2 \leq 50 \quad \text{(II)}$$

In the numerical expression (II), $\epsilon_2$ (1/cm) is an absorption coefficient thereof, $C_2$ (weight %) is concentration of the laser absorbent that absorbs the laser, $L_2$ (cm) is the thickness thereof.

In this occasion, if the absorbance $a_2$ is less than 1, the heat caused by the laser-absorptive molded workpiece absorbing energy of the laser is weak. Therefore, the temperature is not sufficiently increased, and thus the sufficient welding strength between the laser-transmissible-absorptive molded workpiece and the laser-absorptive molded workpiece cannot be achieved. On the other hand, if the absorbance $a_2$ is more than 50, the heat of the laser-absorptive molded workpiece absorbing laser energy becomes excess. Therefore, the voids generate, or the welding strength between the laser-transmissible-absorptive molded workpiece and the laser-absorptive molded workpiece decreases.

When the laser-transmissible-absorptive molded workpiece and the laser-absorptive molded workpiece of the laser-welded article are all colored with the same color, the appearance between the welded molded workpieces colored the same does not show any difference in color. Therefore, the appearance thereof looks pretty.

For preparing the laser-absorptive molded workpiece, the same materials as described for preparing the laser-transmissible-absorptive molded workpiece can be used except for including the colorant that is absorptive to the laser. Also according to uses and purposes, various additives may be properly included.

Following examples describe embodiments concretely. The present invention is not intended to be limited to specific embodiments.

The laser-transmissible-absorptive molded workpiece and the laser-absorptive molded workpiece were manufactured experimentally, and then they were welded by the laser. Examples of experimentally manufacturing the laser-welded articles to which the present invention was applied are shown in Examples 1 to 6. Examples of the laser-welded articles to which the present invention was not applied are shown in Comparative Examples 1 to 4.

Example 1

(1-a) Preparation of Laser-Transmissible-Absorptive Molded Workpiece 499.9 g of a fiber-reinforced polyamide 6 resin of catalog No. ZYTEL 73G30L available from Du Pont that ZYTEL is a registered trademark and 0.1 g of nigrosine of catalog No. NUBIAN BLACK PA9801 available from Orient Chemical Industries, Ltd., which contains 0.75% of iron and 1.08% of aniline, and NUBIAN is a registered trademark, were added in a tumbler made of stainless steel and were mixed with stirring for 1 hour. The obtained mixture was molded at 280° C. of temperature of a cylinder and 80° C. of temperature of a metal mold with general procedures using an injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(1-b) Preparation of Laser-Absorptive Molded Workpiece 499 g of the fiber-reinforced polyamide 6 resin of catalog No. ZYTEL 73G30L available from Du Pont that ZYTEL is the registered trademark and 1.0 g of carbon black of catalog No. #32 available from Mitsubishi Chemical Corporation were added in a tumbler made of stainless steel and were mixed with stirring for 1. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(1-c) Manufacture of Laser-Welded Article

Then, the laser-transmissible-absorptive molded workpiece and the laser-absorptive molded workpiece were piled and put together at one portion thereof. The diode laser machine having 10 W of the output power that is available form Fine Device Co., Ltd. was used. The scanning laser beam of the wavelength of 940 nm was continuously irradiated from upper side of the laser-transmissible-absorptive molded workpiece towards the put portion under 2 mm/sec. of scanning speed for 20 mm to obtain a laser-welded article.

Incidentally the absorption coefficient: $\epsilon$ of nigrosine of NUBIAN (the registered trademark) BLACK PA9801 to rays of 940 nm in DMF was $6.0 \times 10^3$ (ml/g·cm).

Example 2

(2-a) Preparation of Laser-Transmissible-Absorptive Molded Workpiece 499.65 g of the fiber-reinforced polyamide 6 resin of catalog No. ZYTEL 73G30L available from Du Pont that ZYTEL is the registered trademark and 0.35 g of nigrosine of catalog No. NUBIAN BLACK PA9801 available from Orient Chemical Industries, Ltd that NUBIAN is the registered trademark were added in a tumbler made of stainless steel and were mixed with stirring for 1 hour. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(2-b) Preparation of Laser-Absorptive Molded Workpiece

A laser-absorptive molded workpiece having the length of 80 mm, the width of 50 mm and the thickness of 1 mm was prepared by procedures as same as ones of (1-b) in Example 1.

(2-c) Manufacture of Laser-Welded Article

Then, the laser-transmissible-absorptive molded workpiece and the laser-absorptive molded workpiece were piled and put together at one portion thereof. The diode laser machine having 10 W of the output power that is available form Fine Device Co., Ltd. was used. The scanning laser beam of the wavelength of 940 nm was continuously irradiated from upper side of the laser-transmissible-absorptive molded workpiece towards the put portion under 1 mm/sec. of scanning speed for 20 mm to obtain a laser-welded article.

Example 3

(3-a) Preparation of Laser-Transmissible-Absorptive Molded Workpiece 499.65 g of the fiber-reinforced polyamide 6 resin of catalog No. ZYTEL 73G30L available from Du Pont that ZYTEL is the registered trademark and 0.35 g of nigrosine of catalog No. NUBIAN BLACK PA9803 available from Orient Chemical Industries, Ltd., which contains 0.26% of iron and 0.15% of aniline, and NUBIAN is the registered trademark, were added in a tumbler made of stainless steel and were mixed with stirring for 1 hour. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(3-b) Preparation of Laser-Absorptive Molded Workpiece

A laser-absorptive molded workpiece having the length of 80 mm, the width of 50 mm and the thickness of 1 mm was prepared by procedures as same as ones of (1-b) in Example 1.

(3-c) Manufacture of Laser-Welded Article

A laser-welded article was obtained by procedures as same as ones of (2-c) in Example 2.

Incidentally the absorption coefficient: $\epsilon$ of nigrosine of NUBIAN (the registered trademark) BLACK PA9803 to rays of 940 nm in DMF was $6.4 \times 10^3$ (ml/g·cm).

Example 4

(4-a) Preparation of Laser-Transmissible-Absorptive Molded Workpiece 499.5 g of the fiber-reinforced polyamide 6 resin of catalog No. ZYTEL 73G30L available from Du Pont that ZYTEL is the registered trademark and 0.5 g of nigrosine of catalog No. NUBIAN BLACK PA9801 available from Orient Chemical Industries, Ltd that NUBIAN is the registered trademark were added in a tumbler made of stainless steel and were mixed with stirring for 1 hour. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(4-b) Preparation of Laser-Absorptive Molded Workpiece

A laser-absorptive molded workpiece having the length of 80 mm, the width of 50 mm and the thickness of 1 mm was prepared by procedures as same as ones of (1-b) in Example 1.

(4-c) Manufacture of Laser-Welded Article

A laser-welded article was obtained by procedures as same as ones of (2-c) in Example 2.

Example 5

(5-a) Preparation of Laser-Transmissible-Absorptive Molded Workpiece 499.8 g of Polyamide 66 resin of catalog No. ZYTEL 101NC available from Du Pont that ZYTEL is the registered trademark and 0.2 g of nigrosine of catalog No. NUBIAN BLACK PA9801 available from Orient Chemical Industries, Ltd. that NUBIAN is the registered trademark were added in a tumbler made of stainless steel and were mixed with stirring for 1 hour. The obtained mixture was molded at 270° C. of temperature of a cylinder and 60° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(5-b) Preparation of Laser-Absorptive Molded Workpiece

Polyamide 66 resin of catalog No. ZYTEL 101NC available from Du Pont that ZYTEL is the registered trademark and nigrosine of catalog No. NUBIAN BLACK PA9801 available from Orient Chemical Industries, Ltd. that NUBIAN is the registered trademark and carbon black of catalog No. #32 available from Mitsubishi Chemical Corporation were added in a tumbler made of stainless steel and were mixed with stirring for 1 hour according to composition rates shown in Table 1. The obtained mixture was molded at 270° C. of temperature of a cylinder and 60° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(5-c) Manufacture of Laser-Welded Article

Then, the laser-transmissible-absorptive molded workpiece and the laser-absorptive molded workpiece were piled and put together at one portion thereof. The diode laser machine having 10 W of the output power that is available form Fine Device Co., Ltd. was used. The scanning laser beam of the wavelength of 940 nm was continuously irradiated from upper side of the laser-transmissible-absorptive molded workpiece towards the put portion under 4 mm/sec. of scanning speed for 20 mm to obtain a laser-welded article.

Example 6

(6-a) Preparation of Laser-Transmissible-Absorptive Molded Workpiece

Nigrosine of catalog No. NUBIAN BLACK PA9803 available from Orient Chemical Industries, Ltd. that NUBIAN is the registered trademark was dried over using a paddle drier under reduced pressure at 250° C. for 12 hours to prepare purified nigrosine which contains 0.20% of iron and 0.07% of aniline. 499.65 g of the fiber-reinforced polyamide 6 resin of catalog No. ZYTEL 73G30L available from Du Pont that ZYTEL is the registered trademark and 0.35 g of the purified nigrosine were added in a tumbler made of stainless steel and were mixed with stirring for 1 hour. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(6-b) Preparation of Laser-Absorptive Molded Workpiece

A laser-absorptive molded workpiece having the length of 80 mm, the width of 50 mm and the thickness of 1 mm was prepared by procedures as same as ones of (1-b) in Example 1.

(6-c) Manufacture of Laser-Welded Article

A laser-welded article was obtained by procedures as same as ones of (2-c) in Example 2.

Comparative Example 1

(1-A) Preparation of Laser-Transmissible-Absorptive Molded Workpiece 500 g of the fiber-reinforced polyamide 6 resin of catalog No. ZYTEL 73G30L available from Du Pont that ZYTEL is the registered trademark was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(1-B) Preparation of Laser-Absorptive Molded Workpiece

The fiber-reinforced polyamide 6 resin of catalog No. ZYTEL 73G30L available from Du Pont that ZYTEL is the registered trademark and carbon black of catalog No. #32 available from Mitsubishi Chemical Corporation were added in a tumbler made of stainless steel and were mixed with stirring for 1 hour according to composition rates as shown in Table 1. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(1-C) Manufacture of Laser-Welded Article

Then, the laser-transmissible-absorptive molded workpiece and the laser-absorptive molded workpiece were piled and put together at one portion thereof. The diode laser machine having 10 W of the output power that is available form Fine Device Co., Ltd. was used. The scanning laser beam of the wavelength of 940 nm was continuously irradiated from upper side of the laser-transmissible-absorptive molded workpiece towards the put portion under 2 mm/sec. of scanning speed for 20 mm to obtain a laser-welded article.

Comparative Example 2

(2-A) Preparation of Laser-Transmissible-Absorptive Molded Workpiece

Polyamide 66 resin of catalog No. ZYTEL 101NC available from Du Pont that ZYTEL is the registered trademark is used instead of the fiber-reinforced polyamide 6 resin of catalog No. ZYTEL 73G30L in Comparative Example 1, which is available from Du Pont and that ZYTEL is the registered trademark. Except for it and molding at 270° C. of temperature of a cylinder and 60° C. of temperature of a metal mold, a laser-transmissible-absorptive molded workpiece having the length of 80 mm, the width of 50 mm and the thickness of 1 mm was prepared by procedures as same as ones of (1-A) in Comparative Example 1.

(2-B) Preparation of Laser-Absorptive Molded Workpiece

Polyamide 66 resin of catalog No. ZYTEL 101NC available from Du Pont that ZYTEL is the registered trademark and carbon black of catalog No. #32 available from Mitsubishi Chemical Corporation were added in a tumbler made of stainless steel and were mixed with stirring for 1 hour according to composition rates shown in Table 1. The obtained mixture was molded at 270° C. of temperature of a cylinder and 60° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(2-C) Manufacture of Laser-Welded Article

Then, the laser-transmissible-absorptive molded workpiece and the laser-absorptive molded workpiece were piled and put together at one portion thereof. The diode laser machine having 10 W of the output power that is available form Fine Device Co., Ltd. was used. The scanning laser beam of the wavelength of 940 nm was continuously irradiated from upper side of the laser-transmissible-absorptive molded workpiece towards the put portion under 4 mm/sec. of scanning speed for 20 mm to obtain a laser-welded article.

Comparative Example 3

(3-A) Preparation of Laser-Transmissible-Absorptive Molded Workpiece

The fiber-reinforced polyamide 6 resin of catalog No. ZYTEL 73G30L available from Du Pont that ZYTEL is the registered trademark and nigrosine of catalog No. NUBIAN BLACK PA9801 available from Orient Chemical Industries, Ltd. that NUBIAN is the registered trademark were added in a tumbler made of stainless steel and were mixed with stirring for 1 hour according to composition rates shown in Table 1. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(3-B) Preparation of Laser-Absorptive Molded Workpiece

A laser-absorptive molded workpiece having the length of 80 mm, the width of 50 mm and the thickness of 1 mm was prepared by procedures as same as ones of (1-B) in Comparative Example 1.

(3-C) Manufacture of Laser-Welded Article

A laser-welded article was obtained by procedures as same as ones of (1-C) in Comparative Example 1.

Comparative Example 4

(4-A) Preparation of Laser-Transmissible-Absorptive Molded Workpiece

The fiber-reinforced polyamide 6 resin of catalog No. ZYTEL 73G30L available from Du Pont that ZYTEL is the registered trademark and nigrosine of catalog No. NUBIAN BLACK PA9801 available from Orient Chemical Industries, Ltd. that NUBIAN is the registered trademark were added in a tumbler made of stainless steel and were mixed with stirring for 1 hour according to composition rates shown in Table 1. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(4-B) Preparation of Laser-Absorptive Molded Workpiece

The fiber-reinforced polyamide 6 resin of catalog No. ZYTEL 73G30L available from Du Pont that ZYTEL is the registered trademark and nigrosine of catalog No. NUBIAN BLACK PA9801 available from Orient Chemical Industries, Ltd. that NUBIAN is the registered trademark were added in a tumbler made of stainless steel and were mixed with stirring for 1 hour according to composition rates shown in Table 1. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(4-C) Manufacture of Laser-Welded Article

Then, the laser-transmissible-absorptive molded workpiece and the laser-absorptive molded workpiece were piled and put together at one portion thereof. The diode laser machine having 10 W of the output power that is available form Fine Device Co., Ltd. was used. The scanning laser beam of the wavelength of 940 nm was continuously irradiated from upper side of the laser-transmissible-absorptive molded workpiece towards the put portion under 1 mm/sec. of scanning speed for 20 mm to obtain a laser-welded article.

By using polycarbonate resin, the laser-transmissible-absorptive molded workpiece and the laser-absorptive molded workpiece were manufactured experimentally, and then they were welded by the laser. Examples of experimentally manufacturing the laser-welded articles to which the present invention was applied are shown in Examples 7 to 10. Examples of the laser-welded articles to which the present invention was not applied are shown in Comparative Examples 5 to 7.

Example 7

(7-a) Preparation of Laser-Transmissible-Absorptive Molded Workpiece 499.9 g of the polycarbonate resin of catalog No. Panlite 1225Y available from TEIJIN Limited and 0.1 g of nigrosine of catalog No. NUBIAN BLACK PC0850 available from Orient Chemical Industries, Ltd., which contains 0.1% of iron and 0.07% of aniline and that NUBIAN is the registered trademark were added in a tumbler made of stainless steel and were mixed with stirring for 1 hour. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(7-b) Preparation of Laser-Absorptive Molded Workpiece 495 g of the polycarbonate resin of catalog No. Panlite 1225Y available from TEIJIN Limited and 5.0 g of nigrosine of catalog No. NUBIAN BLACK PC0850 available from Orient Chemical Industries, Ltd., and that NUBIAN is the registered trademark were added in a tumbler made of stainless steel and were mixed with stirring for 1 hour. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(7-c) Manufacture of Laser-Welded Article

Then, the laser-transmissible-absorptive molded workpiece and the laser-absorptive molded workpiece were piled and put together at one portion thereof. The diode laser machine having 8 W of the output power that is available form Fine Device Co., Ltd. was used. The scanning laser beam of the wavelength of 940 nm was continuously irradiated from upper side of the laser-transmissible-absorptive molded workpiece towards the put portion under 2 mm/sec. of scanning speed for 20 mm to obtain a laser-welded article.

Incidentally the absorption coefficient: $\epsilon$ of nigrosine of NUBIAN (the registered trademark) BLACK PC0850 to rays of 940 nm in DMF was $4.8 \times 10^3$ (ml/g·cm).

Example 8

(8-a) Preparation of Laser-Transmissible-Absorptive Molded Workpiece

The polycarbonate resin of catalog No. Panlite 1225Y available from TEIJIN Limited and nigrosine of catalog No. NUBIAN BLACK PC0850 available from Orient Chemical Industries, Ltd. that NUBIAN is the registered trademark were added in a tumbler made of stainless steel and were mixed with stirring for 1 hour according to composition rates shown in Table 2. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(8-b) Preparation of Laser-Absorptive Molded Workpiece

A laser-absorptive molded workpiece having the length of 80 mm, the width of 50 mm and the thickness of 1 mm was prepared by procedures as same as ones of (7-b) in Example 7.

(8-c) Manufacture of Laser-Welded Article

A laser-welded article was obtained by procedures as same as ones of (7-c) in Example 7.

Example 9

(9-a) Preparation of Laser-Transmissible-Absorptive Molded Workpiece

The polycarbonate resin of catalog No. Panlite 1225Y available from TEIJIN Limited and nigrosine of catalog No. NUBIAN BLACK PC0850 available from Orient Chemical Industries, Ltd. that NUBIAN is the registered trademark were added in a tumbler made of stainless steel and were mixed with stirring for 1 hour according to composition rates shown in Table 2. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(9-b) Preparation of Laser-Absorptive Molded Workpiece

A laser-absorptive molded workpiece having the length of 80 mm, the width of 50 mm and the thickness of 1 mm was prepared by procedures as same as ones of (7-b) in Example 7.

(9-c) Manufacture of Laser-Welded Article

A laser-welded article was obtained by procedures as same as ones of (7-c) in Example 7.

Example 10

(10-a) Preparation of Laser-Transmissible-Absorptive Molded Workpiece

The polycarbonate resin of catalog No. Panlite 1225Y available from TEIJIN Limited and nigrosine of catalog No. NUBIAN BLACK PC0850 available from Orient Chemical Industries, Ltd. that NUBIAN is the registered trademark were added in a tumbler made of stainless steel and were mixed with stirring for 1 hour according to composition rates shown in Table 2. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(10-b) Preparation of Laser-Absorptive Molded Workpiece

The polycarbonate resin of catalog No. Panlite 1225Y, available from TEIJIN Limited and carbon black of catalog No. #32 available from Mitsubishi Chemical Corporation were added in a tumbler made of stainless steel and were mixed with stirring for 1 hour according to composition rates shown in Table 2. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(10-c) Manufacture of Laser-Welded Article

A laser-welded article was obtained by procedures as same as ones of (7-c) in Example 7.

Comparative Example 5

(5-A) Preparation of Laser-Transmissible-Absorptive Molded Workpiece 500 g of the polycarbonate resin of catalog No. Panlite 1225Y available from TEIJIN Limited was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(5-B) Preparation of Laser-Absorptive Molded Workpiece 495 g of the polycarbonate resin of catalog No. Panlite 1225Y available from TEIJIN Limited and 5.0 g of nigrosine of catalog No. NUBIAN BLACK PC0850 available from Orient Chemical Industries, Ltd., and that NUBIAN is the registered trademark were added in a tumbler made of stainless steel and were mixed with stirring for 1 hour. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(5-C) Manufacture of Laser-Welded Article

Then, the laser-transmissible-absorptive molded workpiece and the laser-absorptive molded workpiece were piled and put together at one portion thereof. The diode laser machine having 8 W of the output power that is available form Fine Device Co., Ltd. was used. The scanning laser beam of the wavelength of 940 nm was continuously irradiated from upper side of the laser-transmissible-absorptive molded workpiece towards the put portion under 2 mm/sec. of scanning speed for 20 mm to obtain a laser-welded article.

Comparative Example 6

(6-A) Preparation of Laser-Transmissible-Absorptive Molded Workpiece

The polycarbonate resin of catalog No. Panlite 1225Y available from TEIJIN Limited and nigrosine of catalog No. NUBIAN BLACK PC0850 available from Orient Chemical Industries, Ltd. that NUBIAN is the registered trademark were added in a tumbler made of stainless steel and were mixed with stirring for 1 hour according to composition rates shown in Table 2. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(6-B) Preparation of Laser-Absorptive Molded Workpiece

A laser-absorptive molded workpiece having the length of 80 mm, the width of 50 mm and the thickness of 1 mm was prepared by procedures as same as ones of (5-B) in Comparative Example 5.

(6-C) Manufacture of Laser-Welded Article

A laser-welded article was obtained by procedures as same as ones of (5-C) in Comparative Example 5.

Comparative Example 7

(7-A) Preparation of Laser-Transmissible-Absorptive Molded Workpiece

The polycarbonate resin of catalog No. Panlite 1225Y available from TEIJIN Limited and nigrosine of catalog No. NUBIAN BLACK PC0850 available from Orient Chemical Industries, Ltd. that NUBIAN is the registered trademark were added in a tumbler made of stainless steel and were mixed with stirring for 1 hour according to composition rates shown in Table 2. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(7-B) Preparation of Laser-Absorptive Molded Workpiece

The polycarbonate resin of catalog No. Panlite 1225Y available from TEIJIN Limited and nigrosine of catalog No. NUBIAN BLACK PC0850 available from Orient Chemical Industries, Ltd. that NUBIAN is the registered trademark were added in a tumbler made of stainless steel and were mixed with stirring for 1 hour according to composition rates shown in Table 2. The obtained mixture was molded at 280° C. of temperature of a cylinder and 80° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(7-C) Manufacture of Laser-Welded Article

A laser-welded article was obtained by procedures as same as ones of (5-C) in Comparative Example 5.

By using polypropylene resin, the laser-transmissible-absorptive molded workpiece and the laser-absorptive molded workpiece were manufactured experimentally, and then they were welded by the laser. Examples of experimentally manufacturing the laser-welded articles to which the present invention was applied are shown in Examples 11 to 13. Examples of the laser-welded articles to which the present invention was not applied are shown in Comparative Examples 8 to 10.

Example 11

(11-a) Preparation of Laser-Transmissible-Absorptive Molded Workpiece 499 g of polypropylene resin of catalog No. HG30U available from Japan Polychem Co., Ltd. and 1.0 g of nigrosine of catalog No. NUBIAN BLACK PC0850 available from Orient Chemical Industries, Ltd., and that NUBIAN is the registered trademark were added in a tumbler made of stainless steel and were mixed with stirring for 1 hour. The obtained mixture was molded at 230° C. of temperature of a cylinder and 60° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(11-b) Preparation of Laser-Absorptive Molded Workpiece 495 g of the polypropylene resin of catalog No. HG30U available from Japan Polychem Co., Ltd. and 5.0 g of nigrosine of catalog No. NUBIAN BLACK PC0850 available from Orient Chemical Industries, Ltd., and that NUBIAN is the registered trademark were added in a tumbler made of stainless steel and were mixed with stirring for 1 hour. The obtained mixture was molded at 230° C. of temperature of a cylinder and 60° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(11-c) Manufacture of Laser-Welded Article

Then, the laser-transmissible-absorptive molded workpiece and the laser-absorptive molded workpiece were piled and put together at one portion thereof. The diode laser machine having 10 W of the output power that is available form Fine Device Co., Ltd. was used. The scanning laser beam of the wavelength of 940 nm was continuously irradiated from upper side of the laser-transmissible-absorptive molded workpiece towards the put portion under 3 mm/sec. of scanning speed for 20 mm to obtain the laser-welded article.

Example 12

(12-a) Preparation of Laser-Transmissible-Absorptive Molded Workpiece

A laser-transmissible-absorptive molded workpiece having the length of 80 mm, the width of 50 mm and the thickness of 1 mm was prepared by procedures as same as ones of (11-a) in Example 11.

(12-b) Preparation of Laser-Absorptive Molded Workpiece

The polypropylene resin of catalog No. HG30U available from Japan Polychem Co., Ltd. and carbon black of catalog No. #32 available from Mitsubishi Chemical Corporation were added in a tumbler made of stainless steel and were mixed with stirring for 1 hour according to composition rates shown in Table 3. The obtained mixture was molded at 230° C. of temperature of a cylinder and 60° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(12-c) Manufacture of Laser-Welded Article

A laser-welded article was obtained by procedures as same as ones of (11-c) in Example 11.

Example 13

(13-a) Preparation of Laser-Transmissible-Absorptive Molded Workpiece 499.5 g of the polypropylene resin of catalog No. HG30U available from Japan Polychem Co., Ltd. and 0.5 g of nigrosine of catalog No. NUBIAN BLACK PC0850 available from Orient Chemical Industries, Ltd., and that NUBIAN is the registered trademark were added in a tumbler made of stainless steel and were mixed with stirring for 1 hour. The obtained mixture was molded at 230° C. of temperature of a cylinder and 60° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(13-b) Preparation of Laser-Absorptive Molded Workpiece

The polypropylene resin of catalog No. HG30U available from Japan Polychem Co., Ltd. and nigrosine of catalog No. NUBIAN BLACK PC0850 available from Orient Chemical Industries, Ltd. that NUBIAN is the registered trademark and carbon black of catalog No. #32 available from Mitsubishi Chemical Corporation were added in a tumbler made of stainless steel and were mixed with stirring for 1 hour according to composition rates shown in Table 3. The obtained mixture was molded at 230° C. of temperature of a cylinder and 60° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(13-c) Manufacture of Laser-Welded Article

A laser-welded article was obtained by procedures as same as ones of (11-c) in Example 11.

Comparative Example 8

(8-A) Preparation of Laser-Transmissible-Absorptive Molded Workpiece 500 g of the polypropylene resin of catalog No. HG30U available from Japan Polychem Co., Ltd. was molded at 230° C. of temperature of a cylinder and 60° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(8-B) Preparation of Laser-Absorptive Molded Workpiece 490 g of the polypropylene resin of catalog No. HG30U available from Japan Polychem Co., Ltd. and 10 g of nigrosine of catalog No. NUBIAN BLACK PC0850 available from Orient Chemical Industries, Ltd., and that NUBIAN is the registered trademark were added in a tumbler made of stainless steel and were mixed with stirring for 1 hour. The obtained mixture was molded at 230° C. of temperature of a cylinder and 60° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(8-C) Manufacture of Laser-Welded Article

Then, the laser-transmissible-absorptive molded workpiece and the laser-absorptive molded workpiece were piled and put together at one portion thereof. The diode laser machine having 10 W of the output power that is available form Fine Device Co., Ltd. was used. The scanning laser beam of the wavelength of 940 nm was continuously irradiated from upper side of the laser-transmissible-absorptive molded workpiece towards the put portion under 3 mm/sec. of scanning speed for 20 mm to obtain a laser-welded article.

Comparative Example 9

(9-A) Preparation of Laser-Transmissible-Absorptive Molded Workpiece

The polypropylene resin of catalog No. HG30U available from Japan Polychem Co., Ltd. and nigrosine of catalog No. NUBIAN BLACK PC0850 available from Orient Chemical Industries, Ltd. that NUBIAN is the registered trademark were added in a tumbler made of stainless steel and were mixed with stirring for 1 hour according to composition rates shown in Table 3. The obtained mixture was molded at 230° C. of temperature of a cylinder and 60° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(9-B) Preparation of Laser-Absorptive Molded Workpiece

A laser-absorptive molded workpiece having the length of 80 mm, the width of 50 mm and the thickness of 1 mm was prepared by procedures as same as ones of (8-B) in Comparative Example 8.

(9-C) Manufacture of Laser-Welded Article

A laser-welded article was obtained by procedures as same as ones of (8-C) in Comparative Example 8.

Comparative Example 10

(10-A) Preparation of Laser-Transmissible-Absorptive Molded Workpiece

The polypropylene resin of catalog No. HG30U available from Japan Polychem Co., Ltd. and nigrosine of catalog No. NUBIAN BLACK PC0850 available from Orient Chemical Industries, Ltd. that NUBIAN is the registered trademark were added in a tumbler made of stainless steel and were mixed with stirring for 1 hour according to composition rates shown in Table 3. The obtained mixture was molded at 230° C. of temperature of a cylinder and 60° C. of temperature of a metal mold with general procedures using the injection molding machine of catalog No. Si-50, which is available from Toyo Machinery & Metal Co., Ltd. Then a laser-transmissible-absorptive molded workpiece having the length of 80 mm, the width of 50 mm and the thickness of 1 mm was prepared.

(10-B) Preparation of Laser-Absorptive Molded Workpiece

The polypropylene resin of catalog No. HG30U available from Japan Polychem Co., Ltd. and nigrosine of catalog No. NUBIAN BLACK PC0850 available from Orient Chemical Industries, Ltd. that NUBIAN is the registered trademark were added in a tumbler made of stainless steel and were mixed with stirring for 1 hour according to composition rates shown in Table 3. The obtained mixture was molded at 230° C. of temperature of a cylinder and 60° C. of temperature of a metal mold with general procedures using the injection molding machine of catalog No. Si-50, which is available from Toyo Machinery & Metal Co., Ltd. Then a laser-absorptive molded workpiece having the length of 80 mm, the width of 50 mm and the thickness of 1 mm was prepared.

(10-C) Manufacture of Laser-Welded Article

A laser-welded article was obtained by procedures as same as ones of (8-C) in Comparative Example 8.

(Physical Evaluations)

The workpieces and the laser-welded articles thereof of Examples and Comparative Examples were evaluated by the following procedures for physical evaluations.

(1) Calculation of an Absorbance (a) and an Absorption Coefficient ($\epsilon_j$)

The absorption coefficient was calculated as follows. By using a spectrophotometer of catalog No. V-570, which is available from JASCO Corporation, the transmissivity $I_T$ of the laser-transmissible-absorptive molded workpiece 1 with the thickness of 1 mm (the thickness $L_1$=0.1 (cm)) under the wavelength of 940 nm was measured. Then the absorbance $a_1$ was calculated to by Lambert-Beer law, which is represented by the following numerical expression (IV)

$$\text{Absorbance } a = -\text{Log } T = -\text{Log } \{I_T/(I_0 - I_R)\} \quad \text{(IV)}$$

In the expression (IV), $I_0$ is the incident light intensity, $I_T$ is the transmitted light intensity, $I_R$ is the reflected light intensity. Then, an analytical curve was prepared. The absorbance $a_1$ is represented by the following numerical expression (V).

$$\text{Absorbance } a_1 = \epsilon_1 C_1 L_1 \quad \text{(V)}$$

Therefore, the absorption coefficient $\epsilon_1$ (1/cm) was calculated from the slope of the analytical curve. An absorbance $a_2$ was calculated similarly. The absorbance $a_2$ is represented by the following numerical expression.

$$\text{Absorbance } a_2 = \epsilon_2 C_2 L_2 \quad \text{(VI)}$$

In the expression (VI), $\epsilon_2$ (1/cm) is the absorption coefficient of the laser-absorptive molded workpiece, $C_2$ (weight %) is the concentration of the laser absorbent included in the workpiece, $L_2$ (cm) is the thickness of the workpiece.

(2) Tensile Strength Test

As regards the laser-welded articles obtained in Examples and Comparative Examples, the tensile strength test using a tensile strength tester of catalog No. AG-50kNE, which is available from Shimadzu Corporation, was executed as follows in order to determine the tensile strength of the welding thereof. In accordance with Japanese Industrial Standard K 7113-1995, the tensile strength of the welding was measured by tensing the laser-welded article to both opposite dimensions of lengthwise, which pulls the welding position apart, under 10 mm/min. of tensile speed.

(3) Visual Observation of Appearance

The appearance of the laser-welded articles obtained in Examples and Comparative Examples were judged by the visual observation to judge if the laser-welded articles were welded with hardly observing any burns or traces of scanning the laser on the surface thereof.

The results of the physical evaluations of the laser-welded articles of Examples and Comparative Examples are shown in Tables 1 to 3 together.

TABLE 1

| Examples of Laser-welded Article Using Polyamide-type Resin | | | Example | | | | | | Comparative Example | | | |
|---|---|---|---|---|---|---|---|---|---|---|---|---|
| | | | 1 | 2 | 3 | 4 | 5 | 6 | 1 | 2 | 3 | 4 |
| *1 | Composition Rate (Weight %) | Polyamide6 | 99.98 | 99.93 | 99.93 | 99.9 | 0 | 99.93 | 100 | 0 | 99.4 | 99.93 |
| | | Polyamide66 | 0 | 0 | 0 | 0 | 99.96 | 0 | 0 | 100 | 0 | 0 |
| | | Nigrosine | 0.02 | 0.07 | 0.07 | 0.1 | 0.04 | 0.07 | 0 | 0 | 0.6 | 0.07 |
| | Property | Thickness (mm) | 1 | 1 | 1 | 1 | 1 | 1 | 1 | 1 | 1 | 1 |
| | | Absorbance | 0.19 | 0.41 | 0.45 | 0.55 | 0.26 | 0.33 | 0.08 | 0.08 | 2.7 | 0.41 |
| | | Transmissivity | 60 | 37 | 36 | 27 | 51 | 44 | 70 | 85 | 0.5 | 37 |
| | | *ε | 4.5 | 4.5 | 4.7 | 4.5 | 5.7 | 3.1 | — | — | 4.5 | 4.5 |
| *2 | Composition Rate (Weight %) | Polyamide6 | 99.8 | 99.8 | 99.8 | 99.8 | 0 | 99.8 | 99.8 | 0 | 99.8 | 99.992 |
| | | Polyamide66 | 0 | 0 | 0 | 0 | 99.7 | 0 | 0 | 99.8 | 0 | 0 |
| | | Nigrosine | 0 | 0 | 0 | 0 | 0.2 | 0 | 0 | 0 | 0 | 0.008 |
| | | Carbon Black | 0.2 | 0.2 | 0.2 | 0.2 | 0.1 | 0.2 | 0.2 | 0.2 | 0.2 | 0 |
| | Property | Thickness (mm) | 1 | 1 | 1 | 1 | 1 | 1 | 1 | 1 | 1 | 1 |
| | | Absorbance | 2.9 | 2.9 | 2.9 | 2.9 | 2.2 | 2.9 | 2.9 | 2.9 | 3.1 | 0.04 |
| | Scanning Speed (mm/sec.) | | 2 | 1 | 1 | 1 | 4 | 1 | 2 | 4 | 2 | 1 |
| | Output Power of Laser (W) | | 10 | 10 | 10 | 10 | 10 | 10 | 10 | 10 | 10 | 10 |
| | Tensile Strength (N) | | 393.5 | 716.2 | 702.8 | 594.3 | 611.0 | 683.1 | 286.8 | 289.0 | *No | *No |
| | Laser Welding of Appearance | | *Ex | *Ex | *Ex | *Ex | *Ex | *Ex | *Ex | *Ex | — | — |

*1: Laser-transmissible-absorptive Molded Workpiece
*2: Laser-absorptive Molded Workpiece
*ε: Absorption Coefficient ε (×10³)
*Ex: Excellent
*No: Not Welding As it is evident with Table 1, the laser-welded articles using the polyamide resin of Examples 1 to 6 are consisting of the laser-transmissible-absorptive molded workpiece and the laser-absorptive molded workpiece and are firmly welded respectively. And each laser-welded article had the excellent tensile strength.

On the other hand, the laser-welded articles of Comparative Examples 1 and 2 include no nigrosine. Therefore, the molded workpieces were allowed to be welded, but each laser-welded article had the insufficient tensile strength as compared with the laser-welded articles of Examples.

The laser-transmissible-absorptive molded workpiece of the laser-welded article of Comparative Example 3 includes 0.6 weight % of nigrosine, and the laser-absorptive molded workpiece of the laser-welded article of Comparative Example 4 includes merely 0.008 weight % of nigrosine. Therefore, the molded workpieces were not welded.

TABLE 2

| Examples of Laser-welded Article Using Polycarbonate Resin | | | Example | | | | Comparative Example | | |
|---|---|---|---|---|---|---|---|---|---|
| | | | 7 | 8 | 9 | 10 | 5 | 6 | 7 |
| *1 | Composition Rate (Weight %) | Polycarbonate | 99.98 | 99.9 | 99.86 | 99.86 | 100 | 99.4 | 99.9 |
| | | Nigrosine | 0.02 | 0.1 | 0.14 | 0.14 | 0 | 0.6 | 0.1 |
| | Property | Thickness (mm) | 1 | 1 | 1 | 1 | 1 | 1 | 1 |
| | | Absorbance | 0.08 | 0.45 | 0.74 | 0.74 | 0 | 2.0 | 0.45 |
| | | Transmissivity | 78 | 33 | 18 | 18 | 91 | 1.2 | 33 |
| | | *ε | 3.3 | 3.3 | 3.3 | 3.3 | — | 3.3 | 3.3 |
| *2 | Composition Rate (Weight %) | Polycarbonate | 99 | 99 | 99 | 99.8 | 99 | 99 | 99.992 |
| | | Nigrosine | 1 | 1 | 1 | 0 | 1 | 1 | 0.008 |
| | | Carbon Black | 0 | 0 | 0 | 0.2 | 0 | 0 | 0 |
| | Property | Thickness (mm) | 1 | 1 | 1 | 1 | 1 | 1 | 1 |
| | | Absorbance | 3.7 | 3.7 | 3.7 | 5.8 | 3.7 | 3.7 | 0.02 |
| | Scanning Speed (mm/sec.) | | 2 | 2 | 2 | 2 | 2 | 2 | 2 |
| | Output Power of Laser (W) | | 8 | 8 | 8 | 8 | 8 | 8 | 8 |
| | Tensile Strength (N) | | 232.2 | 330.1 | 385.3 | 678.1 | 201.2 | *No | *No |
| | Laser Welding of Appearance | | *Ex | *Ex | *Ex | *Ex | *Ex | — | — |

*1: Laser-transmissible-absorptive Molded Workpiece
*2: Laser-absorptive Molded Workpiece
*ε: Absorption Coefficient ε (×10³)
*Ex: Excellent
*No: Not Welding As it is evident with Table 2, the laser-welded articles using the polycarbonate resin of Examples 7 to 10 are consisting of the laser-transmissible-absorptive molded workpiece and the laser-absorptive molded workpiece, and are firmly welded respectively. And each laser-welded article had the excellent tensile strength.

On the other hand, the laser-welded article of Comparative Example 5 includes no nigrosine. Therefore, the molded workpieces were allowed to be welded, but each laser-welded article had the insufficient tensile strength as compared with the laser-welded articles of Examples.

The laser-transmissible-absorptive molded workpiece of the laser-welded article of Comparative Example 6 includes 0.6 weight % of nigrosine, and the laser-transmissible-absorptive molded workpiece of the laser-welded article of Comparative Example 7 includes 0.1 weight % of nigrosine. Therefore, the molded workpieces were not welded.

TABLE 3

| Examples of Laser-welded Article Using Polypropylene Resin | | Example | | | Comparative Example | | |
|---|---|---|---|---|---|---|---|
| | | 11 | 12 | 13 | 8 | 9 | 10 |
| *1 Composition Rate (Weight %) | Polypropylene | 99.8 | 99.8 | 99.9 | 100 | 99.4 | 99.8 |
| | Nigrosine | 0.2 | 0.2 | 0.1 | 0 | 0.6 | 0.2 |
| Property | Thickness (mm) | 1 | 1 | 1 | 1 | 1 | 1 |
| | Absorbance | 0.40 | 0.40 | 0.29 | 0.06 | 0.94 | 0.40 |
| | Transmissivity | 37 | 37 | 47 | 75 | 9 | 37 |
| | *ε | 1.4 | 1.4 | 1.4 | — | 1.4 | 1.4 |
| *2 Composition Rate (Weight %) | Polypropylene | 99 | 99.87 | 99.6 | 98 | 98 | 99.992 |
| | Nigrosine | 1 | 0 | 0.3 | 2 | 2 | 0.008 |
| | Carbon Black | 0 | 0.13 | 0.1 | 0 | 0 | 0 |
| Property | Thickness (mm) | 1 | 1 | 1 | 1 | 1 | 1 |
| | Absorbance | 1.5 | 2.5 | 3.1 | 3.0 | 3.0 | 0.06 |
| Scanning Speed (mm/sec.) | | 3 | 3 | 3 | 3 | 3 | 3 |
| Output Power of Laser (W) | | 10 | 10 | 10 | 10 | 10 | 10 |
| Tensile Strength (N) | | 420.2 | 487.3 | 570.7 | 350.1 | *No | *No |
| Laser Welding of Appearance | | *Ex | *Ex | *Ex | *Ex | — | — |

*1: Laser-transmissible-absorptive Molded Workpiece
*2: Laser-absorptive Molded Workpiece
*ε: Absorption Coefficient ε ($\times 10^3$)
*Ex: Excellent
*No: Not Welding As it is evident with Table 3, the laser-welded articles using the polypropylene resin of Examples 11 to 13 are consisting of the laser-absorptive molded workpiece and the laser-transmissible-absorptive molded workpiece, and are firmly welded respectively. And each laser-welded article had the excellent tensile strength.

On the other hand, the laser-welded article of Comparative Example 8 includes no nigrosine. Therefore, the molded workpieces were allowed to be welded, but each laser-welded article had the insufficient tensile strength as compared with the laser-welded articles of Examples.

The laser-transmissible-absorptive molded workpiece of the laser-welded article of Comparative Example 9 includes 0.6 weight % of nigrosine, and the laser-absorptive molded workpiece of the laser-welded article of Comparative Example 10 includes merely 0.008 weight % of nigrosine. Therefore, the molded workpieces were not allowed to be welded.

INDUSTRIAL APPLICABILITY

The laser-welded article of the present invention is used for automotive parts such as an instrument panel for automotive interior and a silencer: a resonator in engine room; medical apparatus such as a medical tubing used for an instillation of infusion; food pouch such as a spout pouch used for sealing fluid diet and beverage composition; electric or electronic parts; home electric appliances such as housing for example.

What is claimed is:

1. A method for manufacturing a laser-welded article comprising:
a step of molding a laser-transmissible-absorptive molded workpiece from a resin composition which includes
a thermoplastic resin selected from the group consisting of polyamide resin, polycarbonate resin, polyphenylene sulfide resin, polyester resin, and polyolefin resin, and
0.01 to 0.2 weight % of nigrosine alone as colorant which includes aniline of 0.5 weight % concentration at maximum and has an absorption coefficient ε for a ray of 940 nm ranging from 4000 to 7000 (ml/g cm), that partially transmits and partially absorbs laser of wavelength between 800 and 1100 nm;
a step of molding a laser-absorptive molded workpiece from a resin composition which includes
a thermoplastic resin selected from the group consisting of polyamide resin, polycarbonate resin, polyphenylene sulfide resin, polyester resin, and polyolefin resin, and
0.1 to 2 weight % of diverse colorant comprising carbon black, or carbon black and nigrosine which includes aniline of 0.5 weight % concentration at maximum and has an absorption coefficient ε for a ray of 940 nm ranging from 4000 to 7000 (ml/g cm), that absorbs laser of wavelength between 800 and 1100 nm;
a step of piling the laser-transmissible-absorptive molded workpiece onto the laser-absorptive molded workpiece; and
a step of irradiating laser to the laser-transmissible-absorptive molded workpiece at the wavelength between 800 nm and 1100 nm to form an integral construction of piled workpieces, wherein the partially absorbed laser is absorbed into the laser-transmissible-absorptive molded workpiece and causes heat therein, the partially transmitted laser is transmitted through the laser-transmissible-absorptive molded workpiece and is absorbed into the laser-absorptive molded workpiece and causes heat therein, and both the laser-transmissible-absorptive molded workpiece and the laser-absorptive molded workpiece are respectively melted by both of the heats generated from irradiation of the laser, to be welded together, wherein the laser-transmissible-absorptive molded workpiece satisfies the following numerical expression (I)

$$0.19 \leq a_1 = \epsilon_1 C_1 L_1 \leq 0.8 \quad (I)$$

in the numerical expression (I), $a_1$ is absorbance thereof, $\epsilon_1$ (1/cm) is an absorption coefficient thereof, $C_1$ (weight %) is concentration of the colorant therein, and $L_1$ (cm) is thickness thereof, the laser-absorptive molded workpiece satisfies the following numerical expression (II)

$$1 \leq a_2 = \epsilon_2 C_2 L_2 \leq 50 \quad (II)$$

in the numerical expression (II), $a_2$ is absorbance thereof, $\epsilon_2$ (1/cm) is an absorption coefficient thereof, $C_2$ (weight %) is concentration of the diverse colorant therein, and $L_2$ (cm) is thickness thereof, and values of the absorbance $a_1$ and $a_2$ are determined and converted as 1 mm thickness of respective workpieces.

2. The method of claim 1, wherein a tensile stress strength of the laser-welded article in accordance with Japanese Industrial Standard K-7113-1995 is 300N or more.

3. The method of claim 1, wherein the nigrosine in the laser-transmissible-absorptive molded workpiece and/or the laser-absorptive molded workpiece has an average particle size ranging from 5 to 20 microns.

4. The method of claim 1, wherein nigrosine in the laser-transmissible-absorptive molded workpiece and/or the laser-absorptive molded workpiece is at least one selected from the group consisting of compounds represented by following chemical formulas (1) to (4):

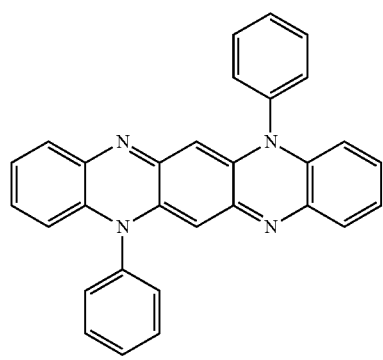

(1)

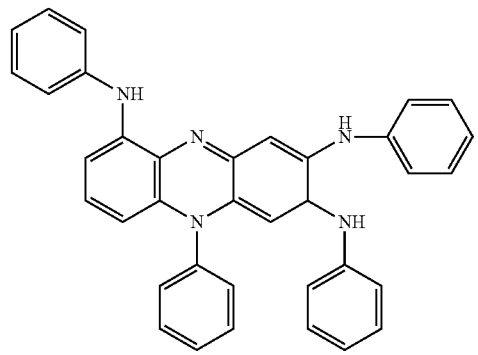

(2)

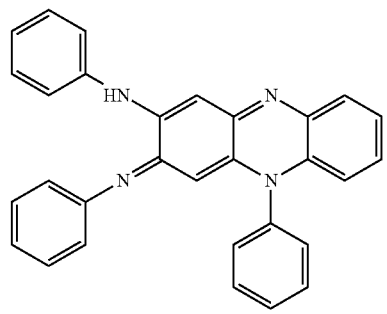

(3)

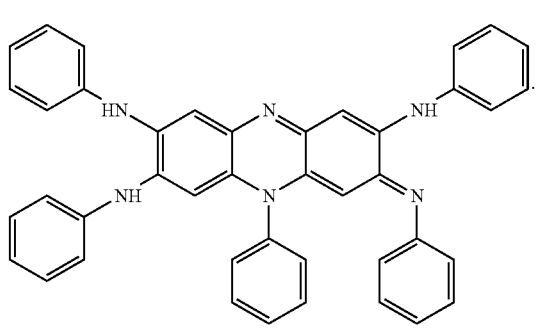

(4)

5. The method of claim 1, wherein the thermoplastic resin in the laser absorptive molded workpiece is a polyamide resin, and the diverse colorants are nigrosine and carbon black, wherein the total amount of the diverse colorants present is 0.1 to 0.6 weight %.

6. The method of claim 1, wherein the thermoplastic resin in the laser absorptive molded workpiece is a polyamide resin and the diverse colorant is 0.1 to 0.3 weight % of carbon black.

7. The method of claim 1, wherein the maximum concentration of iron in nigrosine in the laser-transmissible-absorptive molded workpiece and/or the laser-absorptive molded workpiece is 0.5 weight %.

8. The method of claim 1, wherein the laser-transmissible-absorptive molded workpiece and the laser-absorptive molded workpiece have thicknesses ranging from 200 to 5000 microns.

9. The method of claim 1, wherein the laser-transmissible-absorptive molded workpiece and the laser-absorptive molded workpiece are films having thicknesses ranging from 200 to 1000 microns.

* * * * *